United States Patent [19]

Kurahayashi

[11] Patent Number: 4,543,611

[45] Date of Patent: Sep. 24, 1985

[54] METHOD AND AN APPARATUS FOR IMAGE PROCESSING

[75] Inventor: Sadasuke Kurahayashi, Niiza, Japan

[73] Assignee: Canon Kabushiki Kaisha, Tokyo, Japan

[21] Appl. No.: 544,805

[22] Filed: Oct. 24, 1983

Related U.S. Application Data

[63] Continuation of Ser. No. 309,075, Oct. 6, 1981, abandoned.

[30] Foreign Application Priority Data

Oct. 29, 1980 [JP] Japan ................................. 55-150647

[51] Int. Cl.$^4$ ............................................. H04N 7/12
[52] U.S. Cl. ...................................... 358/260; 358/288
[58] Field of Search ........................ 358/260, 263, 288

[56] References Cited

U.S. PATENT DOCUMENTS

| | | | |
|---|---|---|---|
| 3,950,609 | 4/1976 | Tanaka et al. | 358/260 |
| 4,186,415 | 1/1980 | Takayama | 358/260 |
| 4,225,888 | 9/1980 | Takayama et al. | 358/288 |
| 4,353,095 | 10/1982 | Tatematsu | 358/260 |

*Primary Examiner*—Joseph A. Orsino, Jr.

*Attorney, Agent, or Firm*—Fitzpatrick, Cella, Harper & Scinto

[57] ABSTRACT

The invention realizes high speed image transmission in an image processing system such as a facsimile system by reducing redundancy of an image data source for transmission, and improves the error rate of analog transmission systems by combining a synchronizing signal of a plurality of bits with a skip signal of a plurality of bits. The white block skip system can be applied not only to the AM-PM-VSB system but also to the AM-DSB system by discriminating a synchronizing signal, a skip signal, a guard band signal and a picture signal based on only amplitude data and duration data and not on phase data. Errors in received images due to transmission line distortion are eliminated by first transmitting from a transmitter signals of high level for a predetermined number of bits and then signals of zero level, and by checking at a receiver the received signals every predetermined number of bits. High speed transmission is realized by simultaneously performing detection of the synchronizing signal and the AGC signal. When there is a picture signal immediately after the skip signal, a guard band signal is interposed between these signals. When one skip signal succeeds another, the guard band signal is not included, thus allowing high speed transmission without degradation in image quality.

12 Claims, 37 Drawing Figures

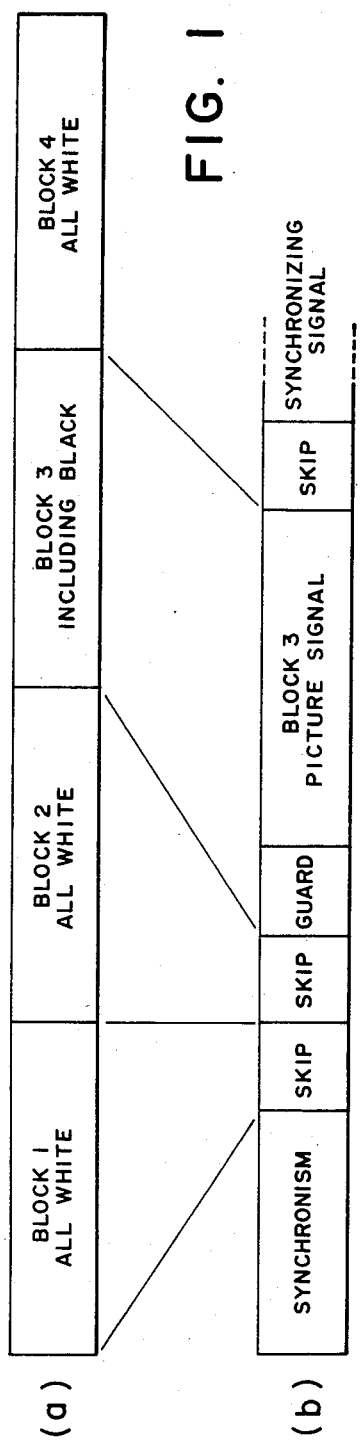
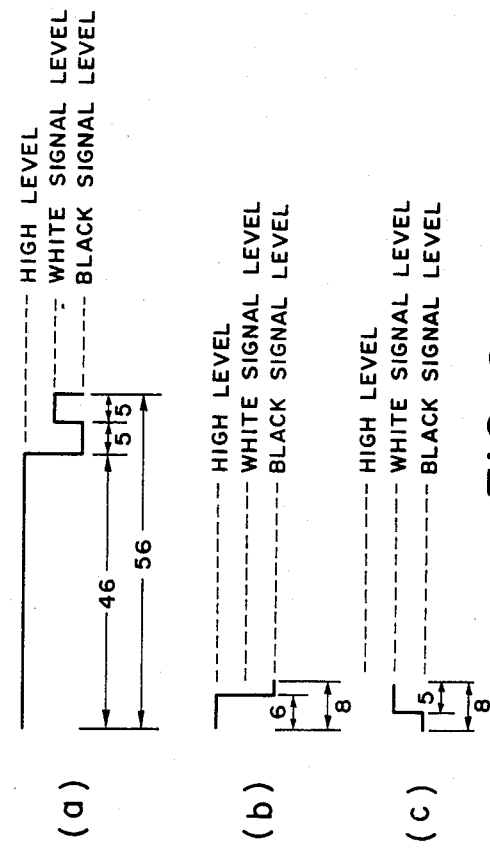

| ADDRESS | MSB | | | DATA | | | | LSB |
|---|---|---|---|---|---|---|---|---|
| 0 | 1 | 1 | 1 | 1 | 1 | 1 | 1 | 1 |
| 1 | 1 | 1 | 1 | 1 | 1 | 1 | 1 | 1 |
| 2 | 1 | 1 | 1 | 1 | 1 | 1 | 1 | 1 |
| 3 | 1 | 1 | 1 | 1 | 1 | 1 | 1 | 1 |
| 4 | 1 | 1 | 1 | 1 | 1 | 1 | 1 | 1 |
| 5 | 0 | 0 | 1 | 1 | 1 | 1 | 1 | 1 |
| 6 | 1 | 1 | 1 | 1 | 0 | 0 | 0 | 0 |

METHOD AND AN APPARATUS FOR IMAGE PROCESSING

This application is a continuation of application Ser. No. 309,075 filed Oct. 6, 1981, now abandoned.

BACKGROUND OF THE INVENTION:

I. Field of the Invention

The present invention relates to a method and apparatus for image processing which reduce redundancy of an image data source for transmission and which realize high speed image transmission without degradation in image quality.

II. Description of the Prior Art

Two high speed image transmission systems are conventionally known: the data source encoding system which realizes high speed transmission by reducing redundancy of the data source to thereby reduce the amount of image data to be transmitted per page, and the modulation/demodulation system which realizes high speed transmission by effectively utilizing the frequency band width of the transmission line to increase the amount of image data which may be simultaneously transmitted.

The M.H encoding system adopted in GIII standards of CCITT is an example of the former system, and the AM-PM-VSB modulation/demodulation system adopted in GII standards or the AM-DSB system adopted in GI standards is an example of the latter system.

In accordance with the known white block skip system a sequence of picture signals for a line is divided into blocks which are examined for black signals. If a black signal is not contained in a block, instead of the picture signals of this block, a skip signal consisting of fewer bits than the picture elements of the block is modulated and transmitted. For a block which does contain a black signal, the picture signals are modulated and transmitted. With this system, since the skip signals are scattered in the transmission signal sequence for a line, three kinds of signals, that is, the skip signal, the synchronizing signal, and the picture signal, must be correctly discriminated. For this reason, signals which have special characteristics never encountered in the picture signal sequence and which may thus be discriminated with certainty are used for the synchronizing signal and the skip signal.

In accordance with a known transmitting and receiving system combining the AM-PM-VSB system and the white block skip system, the synchronizing signal and the skip signal have amplitudes greater than the maximum amplitude (the white signal level in this case) which may be obtained in the picture signal sequence, and the synchronizing signal and the skip signal have phase data which may be differentiated from each other.

With such a conventional system, an amplitude control circuit and a phase control circuit are required at the transmission side, and an amplitude discriminating circuit and a phase discriminating circuit are required at the receiving side. This is disadvantageous in that the manufacturing cost of the equipment is high and the algorithm of transmission and reception is complex. In addition, since this conventional system also utilizes phase data, the white block skip system and the AM-DSB system may not be combined.

SUMMARY OF THE INVENTION

It is the first object of the present invention to provide a method and an apparatus for image processing which provide an analog transmission system with a small error rate.

It is the second object of the present invention to provide a method and an apparatus for image processing which allow the white block skip system to be combined not only with the AM-PM-VSB system but also with the AM-DSB system.

It is the third object of the present invention to provide a method and an apparatus for image processing which eliminate errors of received images due to transmission line distortion.

It is the fourth object of the present invention to provide a method and an apparatus for image processing which achieve high speed image transmission without degradation in image quality.

BRIEF DESCRIPTION OF THE DRAWING

FIGS. 1(a) and 1(b) are views of transmission signals for explaining the method according to the present invention;

FIGS. 2(a), 2(b) and 2(c) are views showing details of the transmission signals shown in FIGS. 1(a) and 1(b);

FIGS. 5(a), 5(b) and 5(c) show output waveforms of a timing clock pulse generating circuit shown in FIG. 3;

DETAILED DESCRIPTION OF THE PREFERRED EMBODIMENTS

Figure 3:
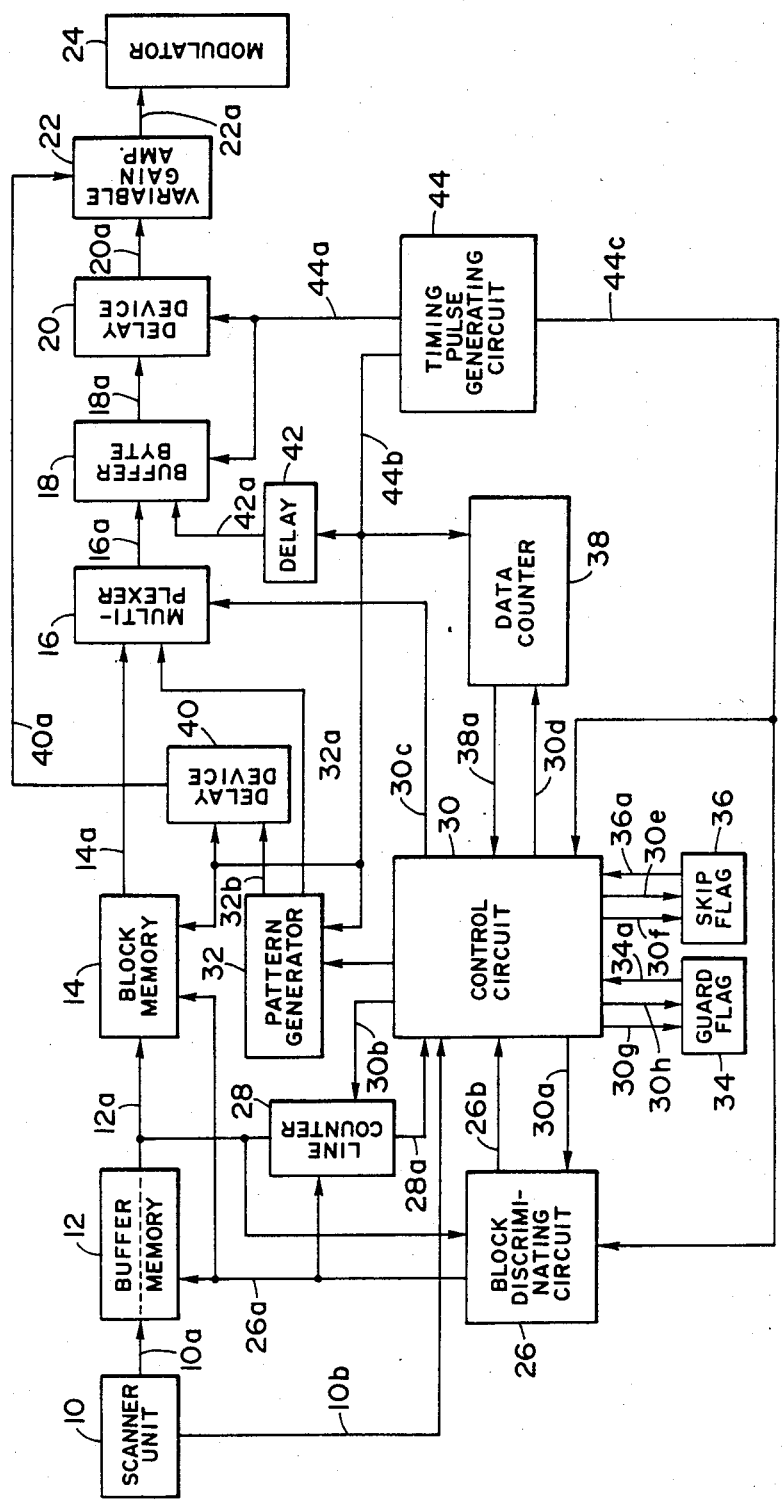
FIG. 3 is a block diagram showing the overall construction of a transmitter used in the method of the present invention.

The basic principle of operation of the present invention will first be described.

According to the present invention, a transmitter divides an L-bit picture signal sequence of a line read by a scanner into M blocks. If the number of picture elements in one block is represented by N, $L=M \times N$ where L, M and N are all integers. The picture signals contained in each block are then examined. If the block entirely consists of white data, the signals are converted to a picture signal of N bits and a skip signal of n bits is modulated and transmitted. If a black picture element of 1 or more bits is contained in the picture signals of one block, the picture signal of N bits is directly modulated and transmitted. The bit construction is such that $N=a \times n$ where $N>n$ and a and n are integers. It is preferable that $n>1$. The reason for this may be explained as follows. The skip signal has an important meaning in the method of the present invention. The error rate is great in the AM-PM-VSB system or AM-DSB system which are analog transmission systems.

Therefore, if n=1, it becomes very difficult to receive correct images in actual transmission. A synchronizing signal of l bits is attached to the head of each line, where l is a multiple of n. Therefore, l>n. The skip signal herein has an n-bit signal pattern wherein a signal of an amplitude (to be referred to as a signal of high level hereinafter) greater than the maximum amplitude of the picture signals is produced for a certain interval and is then followed by a signal of zero amplitude of the picture signal. The synchronizing signal has an l-bit signal pattern wherein a signal of high level is produced for a longer duration than the skip signal and is then followed by a signal of zero amplitude of the picture signal.

With the construction described above, the picture signals are sequentially modulated and transmitted from the transmitter so that the l-bit synchronizing signal is transmitted at the head of each line and the skip signal is included at the position of the white block in the picture signals.

The receiver first demodulates the sequentially received signals to generate base band signals, the amplitudes of which are examined to differentiate the picture signals from the synchronizing signals and the skip signals. The duration of the signal of high level (the interval between signals of zero level) is examined to differentiate the synchronizing signals from the skip signals. The receiver is constructed so as to discriminate the skip signals and the picture signals at the timing of the signal of the n-th bit from the timing of the synchronizing signal.

With this construction of the present invention, by using the skip signal and the synchronizing signal of a plurality of bits, the white block skip system may be combined with the analog transmission system with which the error rate is relatively great. Furthermore, since the synchronizing signal, the skip signal and the picture signal may be discriminated based on two types of data, that is, amplitude data and duration data, the algorithm may be simplified. Since phase data is not used for the purpose of discrimination, the white block skip system may be combined with the analog transmission system of either AM-DSB type or AM-PM-VSB type. The transmitter and the receiver operate based on the units of n bits which are determined in advance. Therefore, an image transmission method adopting a high speed transmission system may be provided which eliminates errors in the received images due to distortion of the transmission line and which is simple in structure and less expensive.

The preferred embodiments of the present invention will now be described in more detail with reference to the accompanying drawings.

The embodiments of the present invention will first be described with reference to the transmitting side and then the receiving side. Although the description will be made with reference to the AM-PM-VSB modulation/demodulation system, the same applies to the AM-DSB system.

FIG. 1 shows the configuration of the transmission signal according to the method of the present invention. FIG. 1(a) shows a picture signal sequence of one line which is represented by binary signals of white or black signals. One line consists of 256 bits and one block consists of 64 bits. Therefore, one line is divided into four blocks. If only the third block contains black data, the transmission signal is transmitted as the signal as shown in FIG. 1(b).

Before initiating the transmission of one line, a synchronizing signal is transmitted. Since the first block is an all white block, a skip signal is transmitted. Since the second block is also an all white block, another skip signal is transmitted. Since the third block contains a black signal, the picture signal is directly transmitted. When the immediately preceding block is a skip signal, a guard band signal is transmitted immediately before the picture signal. This guard band signal is included to prevent the adverse effects of ringing of the trailing edge of the waveform of the skip signal having the double amplitude on the leading edge of the waveform of the picture signal to follow. The 64-bit picture signal of the third block is transmitted following the guard band signal. Since the fourth block is an all white block, a skip signal is transmitted, thus completing the transmission of the line.

FIG. 2 shows the configuration of the synchronizing signal, the skip signal and the guard band signal. The synchronizing signal comprises a 56-bit signal wherein the high level continues for a duration of 46 bits, the black signal level continues for a duration of 5 bits, and the white signal level continues for a duration of 5 bits, as shown in FIG. 2(a). The skip signal comprises an 8-bit signal wherein the high level continues for a duration of 6 bits and the black signal level continues for a duration of 2 bits, as shown in FIG. 2(b). The guard band signal comprises an 8-bit signal wherein the black signal level continues for a duration of 3 bits and the white signal level continues for a duration of 5 bits, as shown in FIG. 2(c).

In this manner, all the signals are made up of units of 8 bits. This facilitates control by a microprocessor or the like.

FIG. 3 is a block diagram of a transmitter utilizing the method of the present invention.

A scanner unit 10 reads the picture signals corresponding to one main scanning line of an original (not shown) and generates a binary signal sequence of white and black. The scanner unit 10 comprises an image pickup device such as a CCD (charge-coupled device) or the like and an optical system. An output of a signal line 10a from the scanner unit 10 is a binary picture signal sequence for one line which is an 8-bit parallel output. The LSB (least significant bit) of the 8 bits corresponds to the left side of the main scanning line. An output of a signal line 10b from the scanning unit 10 is a signal which indicates whether or not the scanning of the original is completed and which is input to a control circuit 30 to be described later. A double buffer memory 12 stores the picture signals for two lines. When one line consists of 256 bits, the double buffer memory 12 comprises two buffers each of 8×32 bits. The double buffer memory 12 so operates that the picture signals of the current line are transmitted to one line memory while the picture signals of the next line are written in the other line memory.

A signal line 12a is an output line from the double buffer memory 12, from which the picture signals are 8-bit parallel outputs. A reading clock pulse is output from a block discriminating circuit 26 through a signal line 26a connected to the input end of the buffer memory 12. In synchronism with this clock pulse, an 8-bit picture signal is sequentially output to the signal line 12a. Data for one line is output to the signal line 12a when 16 reading clock pulses are input through the signal line 26a from the block discriminating circuit 26, since one line consists of 256 bits.

A block memory 14 comprises a FIFO (first in first out) memory. The block memory 14 may alternatively comprise a general RAM or the like and has a capacity sufficient to store picture signals for one block. The signal from the signal line 26a is input as a writing clock pulse to the block memory 14. In synchronism with a reading signal obtained from a timing clock pulse generating circuit 44 through a signal line 44b, an 8-bit picture signal is sequentially output from the block memory 14 through a multiplexer 16 to be described later to a byte buffer 18 also to be described later.

The multiplexer 16 selects an input of a signal line 14a or 32a and outputs a signal from the block memory 14 or a pattern generator 32 to a signal line 16a. The selection of signals is performed based on a signal obtained through a signal line 30c from the control circuit 30 to be described later.

The byte buffer 18 latches the 8-bit parallel signal input through the signal line 16a with a clock pulse (byte clock pulse) input from a signal line 42a, and outputs a parallel signal bit by bit to a signal line 18a at the timing of a bit timing clock pulse input through a signal line 44a. The byte buffer 18 comprises a parallel-in serial-out shift register or the like and sequentially serially outputs the 8-bit parallel signal from the LSB.

A 1-bit delay device 20 delays the transmission signal input through the signal line 18a by a time interval corresponding to a one-bit timing clock pulse input through the signal line 44a of the timing clock pulse generator 44, and outputs a signal on a signal line 20a.

The gain of a variable gain amplifier 22 is switched according to whether the signal obtained through the signal line 40a is at level "1" or "0". When the signal obtained through the signal line 40a is at level "1", the gain becomes 2. When it is at level "0", the gain becomes 1. The transmission signal amplified by the variable gain amplifier 22 is output to a signal line 22a.

An AM-PM-VSB modulator 24 is of known type and will not be described in detail. The transmission signal input through the signal line 22a is band-compressed by a suitable LPF (low-pass filter) within the modulator 24 to eliminate distortion by modulation and is then AM-PM-VSB modulated to be transmitted to the transmission line through a network control unit NCU (not shown).

In response to a start pulse from the control circuit 30, to be described later, from a signal line 30a, the block discriminating circuit 26 starts operating. The block discriminating circuit 26 outputs 8 shift clock pulses to the signal line 26a to transfer the picture signals of one block (64 bits) in the double buffer memory 12 to the block memory 14. The block discriminating circuit 26 also checks the picture signal of 64 bits output from the double buffer memory 12 through the signal line 12a to output to a signal line 26b a signal of level "1" in the case of an all white level, and a signal of level "0" when a black signal of 1 bit or more is included. These signals are set when the transfer of the signal of 64 bits is completed and their values are held until the next start pulse is available on the signal line 30a. The shift clock pulse output to the signal line 26a is prepared by selecting 8 successive timing pulses supplied as an output to a signal line 44c from the timing pulse generator 44 to be described later.

A line counter 28 counts clocks obtained through the signal line 26a from the block discriminating circuit 26. Since one line consists of 256 bits, the completion of transfer of data for one line is confirmed when 16 clock pulses from the block discriminating circuit 26 are counted. Then, a signal of level "1" is output on a signal line 28a, and the completion of the transfer is signalled to the control circuit 30. The line counter 28 is reset by a clear pulse from a signal line 30b of the control circuit 30.

Figures 4, 5:
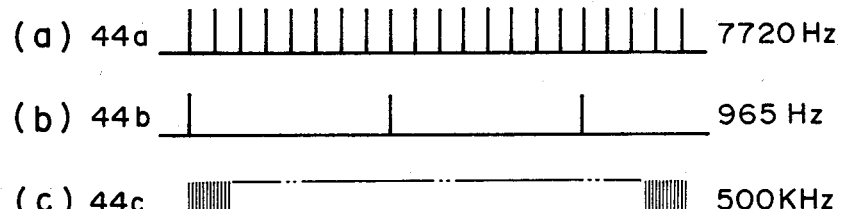
FIG. 4 is a truth table showing the content of the memory map of a pattern generator shown in FIG. 3.

The pattern generator 32 comprises an address setting circuit and a 9×7-bit ROM or the like. FIG. 4 shows the memory map of the pattern generator 32. Seven 9-bit data are output for the respective addresses of 0 to 6. The LSB (least significant bit) is output to a signal line 32b, and the remaining 8 bits are output to the signal line 32a. The signal output to the signal line 32b serves to determine the gain of the 8-bit data which are simultaneously latched in the byte buffer 18 and are thereafter sequentially transmitted at the timings of the bit timing clock pulses, and is input to the variable gain amplifier 22 through a delay device 40. The 8-bit data output from the pattern generator 32 generates the three kinds of signals, the synchronizing signal, the skip signal, and the guard band signal according to the reading signal. For generating the guard band signal shown in FIG. 2(c), the address as shown in FIG. 4 is set to be 6. Then, the 8-bit data of "11111000" is output to the signal line 32a, and a signal of level "0" is output to the signal line 32b, so that the gain of the variable gain amplifier 22 becomes 1. The 8-bit data is sequentially output from the side of the LSB by the byte buffer 18. The level "1" of the signal corresponds to the white signal and the level "0" of the signal corresponds to the black signal. Thus, the guard band signal as shown in FIG. 2(c) is generated from the 8-bit data "11111000" of the signal line 32a.

For generating the skip signal shown in FIG. 2(b), the address shown in FIG. 4 is set to 5. Then, the 8-bit data "00111111" and the data "1" of the LSB are obtained at the signal line 32a, so that the gain of the variable gain amplifier 22 becomes 2. For generating the synchronizing signal shown in FIG. 2(a), the address is changed from 0 to 6 in synchronism with the byte timing clock pulses obtained at the signal line 44b. Then, a 7-byte, that is, 7×8-bit synchronizing signal is output from the signal line 32a of the pattern generator 32. Simultaneously, a gain control signal for making the gain 2 for the first 51 bits and 1 for the remaining 5 bits is output to the signal line 32b for controlling the gain of the variable gain amplifier 22 when generating the respective byte signals.

The address setting circuit of the pattern generator 32 comprises a 3-bit counter. This counter counts the byte timing clock pulses input from the signal line 44b and changes its output from 0 to 6. When the output is 6, the counter stops counting irrespective of the reception of the byte timing clock pulses. The 3-bit counter is preset to a suitable value of 0 to 6 by a signal input through a signal line 30i.

The output from the 3-bit counter is input as the address input to the 9×7-bit ROM described above.

A guard flag 34 comprises an RS flip-flop. The guard flag 34 is set by a set pulse input through a signal line 30g and is reset by a reset pulse input through a signal line 30h. The guard flag 34 produces an output to a signal line 34a, which is input to the control circuit 30 to be described later.

A skip flag 36 comprises an RS flip-flop. The skip flag 36 is set by a set signal input through a signal line 30e and is reset by a reset signal input through a signal line 30f. An output of a signal line 36a from the skip flag 36 is input to the control circuit 30.

A data counter 38 performs subtraction in response to a byte timing clock pulse input through the signal line 44b. The count of the data counter 38 is input through a signal line 38a to the control circuit 30. The data counter 38 is preset to a suitable count by the signal input from the control circuit 30 through a signal line 30d.

A delay device 42 outputs to the signal line 42a a timing pulse which is delayed by a certain time interval from the byte timing clock pulse input through the signal line 44b from the timing clock pulse generating circuit 44. This delayed pulse serves as a pulse to latch the 8-bit data at the byte buffer 18.

The timing clock pulse generating circuit 44 generates various kinds of timing clock pulses and outputs three kinds of timing clock pulses in this embodiment. FIG. 5 shows the timing relationship between these three kinds of timing clock pulses. A bit timing clock pulse having a frequency of, for example, 7,720 Hz is output to the signal line 44a (FIG. 5(a)), and is applied to the byte buffer 18 and the delay device 20. Since the transmission data is transmitted at this pulse timing, the transmission speed becomes 7,720 bps. As shown in FIG. 5(b), a byte timing clock pulse obtained by frequency division by 8 of the bit timing clock pulse is obtained at the signal line 44b and is applied to the respective circuits 14, 32, 38, 40 and 42. The frequency of this byte timing clock pulse becomes 7,720/8=965 Hz. A shift timing clock pulse to be supplied to the block discriminating circuit 26 is obtained at the signal line 44c. This shift timing clock pulse has higher frequency than the bit timing clock pulse. The frequency of the shift timing clock pulse is selected to be 500 kHz as shown in FIG. 5(c) in this embodiment. This shift timing clock pulse is also input to the control circuit 30.

The delay device 40 comprises a flip-flop or the like and outputs a signal input through the signal line 32b to a signal line 40a as delayed by a time interval corresponding to the period of the byte timing clock pulse input through the signal line 44b.

The control circuit 30 supplies a start pulse to the block discriminating circuit 26 through the signal line 30a as described above, discriminates the block signals from the signal line 26b, and generates the four kinds of signals, the synchronizing signal, the skip signal, the guard band signal, and the picture signal. This may be accomplished by driving the pattern generator 32 through the signal line 30i. The control circuit 30 detects the end of the original and the completion of the line scanning through the scanner unit 10, the line counter 28, and signal lines 10b and 28a, and is connected to the data counter 38 through the signal lines 38a and 30d. The control circuit 30 is also connected to the guard flag 34 and the skip flag 36.

The operation of the control circuit 30 of the construction as described above will now be described with reference to the flow chart shown in FIG. 6.

The control circuit 30 checks the output of the data counter 38, which is input through the signal line 38a. It does not operate until its value is 0 (6a). When the output 38a of the data counter 38 becomes 0, the control circuit 30 then checks the output of the line counter 28, which is input through the signal line 28a (6b). When one line is transmitted, that is, when 32 shift clock pulses are generated through the signal line 26a, the output through the signal line 28a goes to level "1". Other than this condition, the output at the signal line 28a is at level "0". When the output of the signal line 28a is at level "0", that is, the transmission of one line is not yet completed (N side of 6b), the control circuit 30 checks the output of the signal line 34a of the guard flag 34. When this output is at level "1", the control circuit 30 resets the guard flag in step 6d and sets the picture signal in step 6e. When the guard flag is at level "0", the control circuit 30 sends out a check pulse in step 6f, completes the checking in step 6g, and checks the output of the signal line 26b of the block discriminating circuit 26 to determine if the next block is all white level or not (6h). If the next block is all white level, the control circuit 30 sets the skip flag 36 in step 6i and sets the skip signal in step 6j. If the next block is not all white level, it is checked-if the skip flag is at level "1" in step 6k. If the skip flag is not at level "1", the program advances to steps 6d and 6e to set the picture signal. If the skip signal is at level "1", that is, if a skip is to be made for this block, the guard flag is set in step 6l, the skip flag is reset in step 6m, the guard signal is set in step 6n. The set and reset pulses for the skip flag are obtained at the signal lines 30e and 30f, and the set and reset pulses for the guard flag are obtained at the signal lines 30g and 30h. When the output of the signal line 28a of the line counter 28 is at level "1", the program branches to the Y side in step 6b to check the signal of the signal line 10b of the scanner unit 10 to determine if the transmission of the original is completed (6p). When the transmission is not completed, a line counter clear pulse is output to the signal line 30b and a skip flag reset pulse is output to the signal line 30f. The next byte timing clock pulse sets the synchronizing signal to be transmitted (6q, 6r, and 6s).

The control operation of the control circuit 30 for the pattern generator 32 and the data counter 38 for generating the four kinds of signals will now be described.

When the control circuit 30 discriminates the block signal from the signal line 26b to set the synchronizing signal, the control circuit 30 sets the output of the address setting circuit in the pattern generator 32 to 0 through the signal line 30i. Simultaneously, the output of the data counter 38 is set to 7 through the signal line 30d. For setting the skip signal, the output of the address setting circuit in the pattern generator 32 is set to 5 through the signal line 30i. Simultaneously, the output of the data counter 38 is set to 1 through the signal line 30d.

For setting the guard band signal, the output of the address setting circuit in the pattern generator 32 is set to 6 through the signal line 30i. Simultaneously, the output of the data counter 38 is set to 1 through the signal line 30d.

In setting any of the three signals, the pattern signal from the pattern generator 32 is transmitted. Therefore, the output 30c is simultaneously set to 1, and the output of the signal line 32a of the pattern generator 32 is selected as the output of the signal line 16a of the multiplexer 16.

If the control circuit 30 discriminates that the block contains black data based on the signal from the block discriminating circuit 26, the output of the address setting circuit in the pattern generator 32 is set to 6 through the signal line 30i for setting the picture signals. Simultaneously, the output of the data counter 38 is set to 8 through the signal line 30d. Simultaneously, the output of the signal line 30c is set to level "0" so that the output of the signal line 14a from the block memory 14 is selected as the output of the signal line 16a from the multiplexer 16.

The mode of operation of the transmitting circuit shown in FIG. 3 will now be described with reference to the flow chart shown in FIG. 6 and the timing chart shown in FIG. 7.

Since the block signal as shown in FIG. 1 is read out from the scanner unit 10, the signal obtained at the signal line 22a of the variable gain amplifier 22 has a transmission base band waveform as shown in FIG. 7(a). From the left in the figure, a 56-bit (7-byte) synchronizing signal is followed by two 1-byte skip signals and a 1-byte guard band signal. A 64-bit (8 byte) picture signal corresponding to the picture signal of the third block is then transmitted, and a 1-byte skip signal corresponding to the fourth block is transmitted, thus completing transmission of one line.

Since the synchronizing signal is first set, the output of the address setting circuit is set to 0 and the output of the data counter 38 is set to 7. In response to byte timing clock pulse S1 of the signal line 44b, shown in FIG. 7(c), 1-byte data (11111111=FF) corresponding to the address 0 is loaded in the byte buffer 18 as shown in FIG. 7(d). Simultaneously, as shown in FIG. 7(f), the output of the data counter 38 becomes 6. At this time, the output of the address setting circuit (not shown) in the pattern generator 32 changes from 0 to 1. Until the next byte timing clock pulse S2 shown in FIG. 7(c) is generated, the data loaded in the byte buffer 18 is sequentially transmitted from the LSB in synchronism with the bit timing clock pulse of the signal line 44a shown in FIG. 3.

When the byte timing clock pulse S2 shown in FIG. 7(c) is generated, the next data (FF) corresponding to the address 1 in FIG. 4 is loaded in the byte buffer 18. Simultaneously, 1 is subtracted from the output of the data counter 38 and the output of the data counter 38 is set to 5. Since the second byte of the synchronizing signal is output to the byte buffer 18, the output of the address setting circuit in the pattern generator 32 changes from 1 to 2. Thereafter, all seven bytes of the synchronizing signal are sequentially loaded in the byte buffer 18 in synchronism with the byte timing clock pulses S3, S4, S5, S6 and S7. When the byte timing clock pulse S7 is generated, the final byte data (F8) of the synchronizing signal is loaded in the byte buffer 18. Simultaneously, since the output of the signal line 38a of the data counter 38 goes to level "0", the control circuit 30 starts operating. Since the output to the signal line 28a of the line counter 28 is at level "0" and the output of the signal line 34a from the guard flag 34 is at level "0", the control circuit 30 first supplies a check pulse to the signal line 30a (step 6f in FIG. 6, and FIG. 7(g)). In response to this check pulse, the block discriminating circuit 26 operates the data of the first block is transferred from the double buffer memory 12 to the block memory 14, and the white/black level of the signal is discriminated. The period in which the block discriminating circuit 26 is operative is indicated by hatched lines X in FIG. 7(h). As a result of the checking, a signal of level "1" indicating that the signal of the first block is all white level is output to the signal line 26b as shown in FIG. 7(i). Therefore, the control circuit 30 discriminates that a skip signal must be output next, sets the skip flag as shown in FIG. 7(k), and sets the output of the data counter 38 to 1 as shown in FIG. 7(f). The control circuit 30 also sets the output, 5, of the address setting circuit through the signal line 30i to the pattern generator 32.

When a byte timing clock pulse S8 is generated, the same operation as in the case of the byte timing clock pulse S7 is performed, and the skip signal corresponding to the second block is set.

Figure 6:
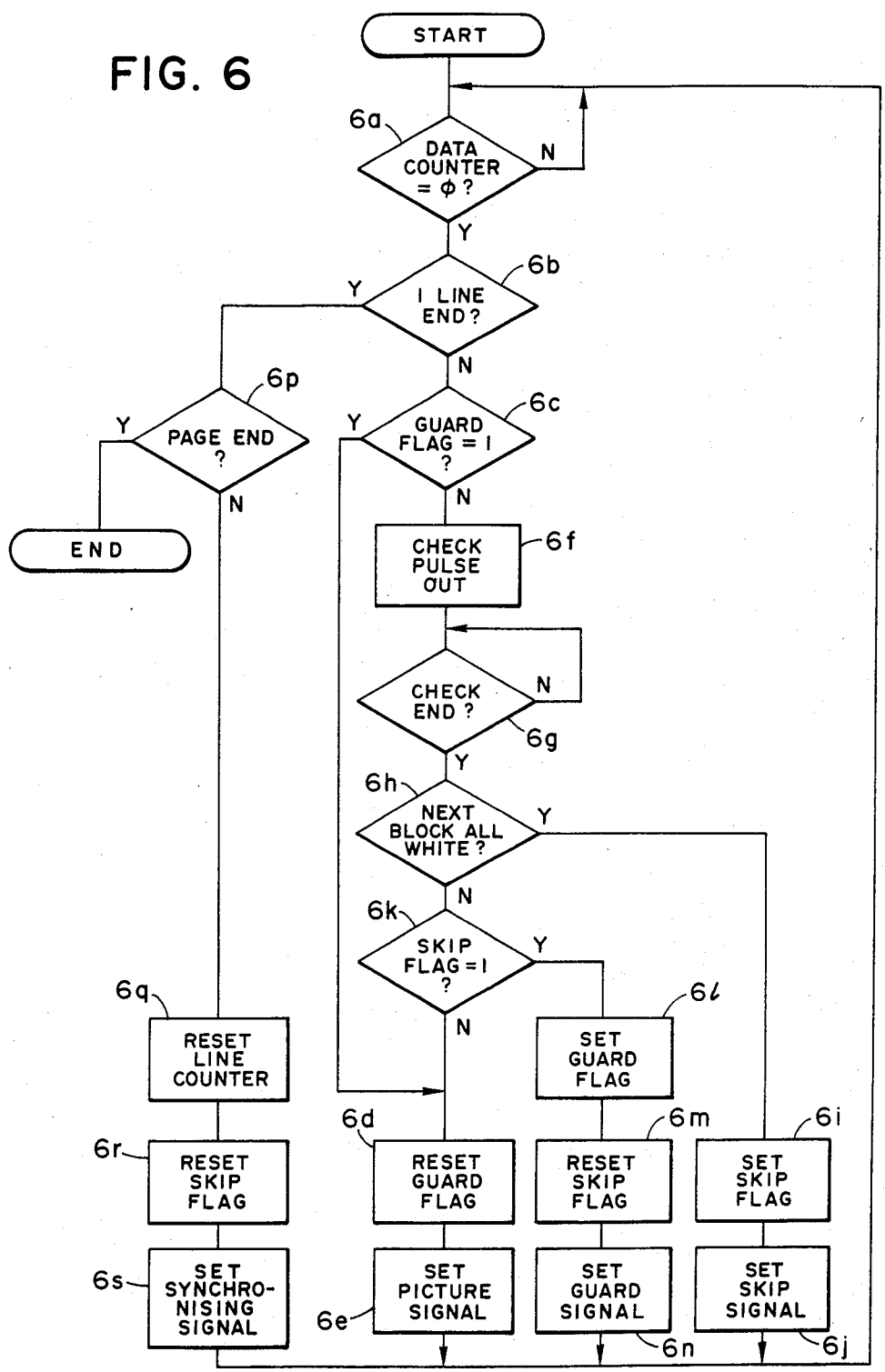
FIG. 6 is a flow chart for explaining the mode of operation of a control circuit shown in FIG. 3.
Figure 7:
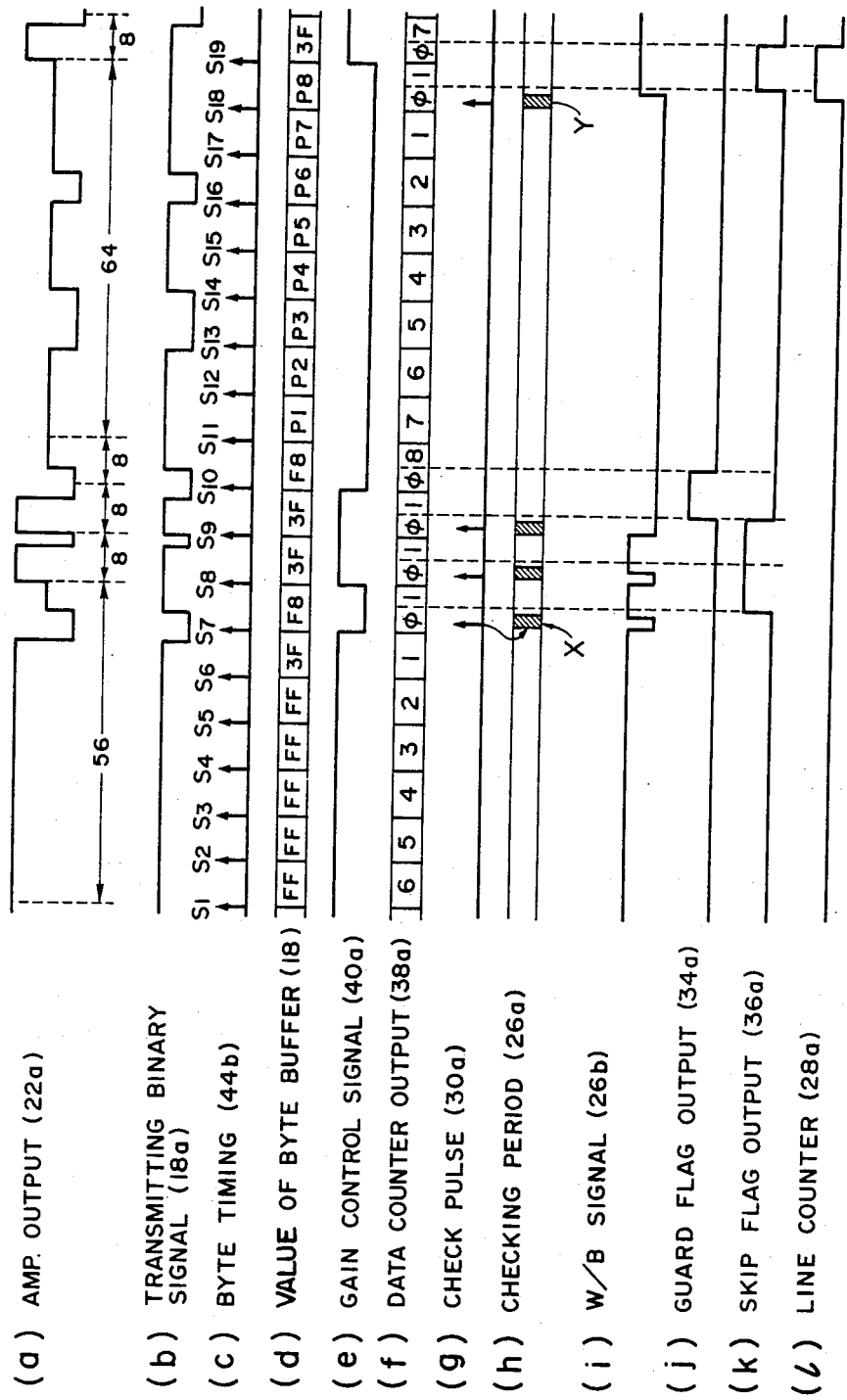
FIGS. 7(a) to 7(l) are timing charts for explaining the mode of operation of the transmitter.

When a byte timing clock pulse S9 is generated, that is, when the skip signal corresponding to the second block is loaded in the byte buffer 18, it is discriminated by the control circuit 30 that a guard flag must be output according to the flow chart shown in FIG. 6 since the third block contains black data and the skip flag is set. Therefore, the output of the data counter 38 is set to 1 as shown in FIG. 7(f), and the output of the address setting circuit in the pattern generator 32 is set to 6.

When a byte timing clock pulse S10 is generated, the guard band signal data (F8) is loaded in the byte buffer 18. Since the output of the signal line 34a from the guard flag 34 is at level "1", the control circuit 30 sets the picture signal without checking the check pulse. Thus, the control circuit 30 sets the output of the data counter 38 to 8, and the output of the address setting circuit of the pattern generator 32 to 6. Simultaneously, a reset pulse is output to a signal line 30g and the guard flag 34 is reset as shown in FIG. 7(i). Thereafter, the data of 64 bits (8 bytes) of the third block is sequentially loaded in the byte buffer 18 in synchronism with byte timing clock pulses S11, S12, S13, S14, S15, S16, S17 and S18. The data thus output is represented by P1 to P8 in FIG. 7(d).

When the final byte P8 of the third block is loaded in the byte buffer 18, that is, when the byte timing clock pulse S18 shown in FIG. 7(c) is generated, the output of the data counter 38 goes to level "0" as shown in FIG. 7(f) so that the control circuit 30 starts operating. At this instant, since the output of the signal line 28a of the line counter 28 is at level "0" and the output of the signal line 34a of the guard flag 34 is at level "0", the fourth block is checked (Y). The output of the signal line 26b of the block discriminating circuit 26 then goes to level "1" (that is, the fourth block is discriminated to be all white level), and the skip signal is set as the next data. At this instant, the output of the signal line 28a of the line counter 28 is set to level "1" indicating that the transmission of picture signals for one line is completed.

When a byte timing clock pulse S19 is generated, a skip signal 3F as the final data of the line is loaded in the byte buffer 18. Since the output of the data counter 38 goes to level "0", the control circuit 30 starts operating again. Since the output of the signal line 28a of the line counter 28 is 1 as shown in FIG. 7(l), it is discriminated that the transmission of data for one line is completed. If the signal line 10b from the scanner unit 10 is checked and the transmission of the original is not yet completed, the control circuit 30 sets the synchronizing signal at the head of the next line. The same procedure is repeated for sequentially transmitting the image data for one original.

The construction and mode of operation of the receiver will now be described in detail.

Figure 8:
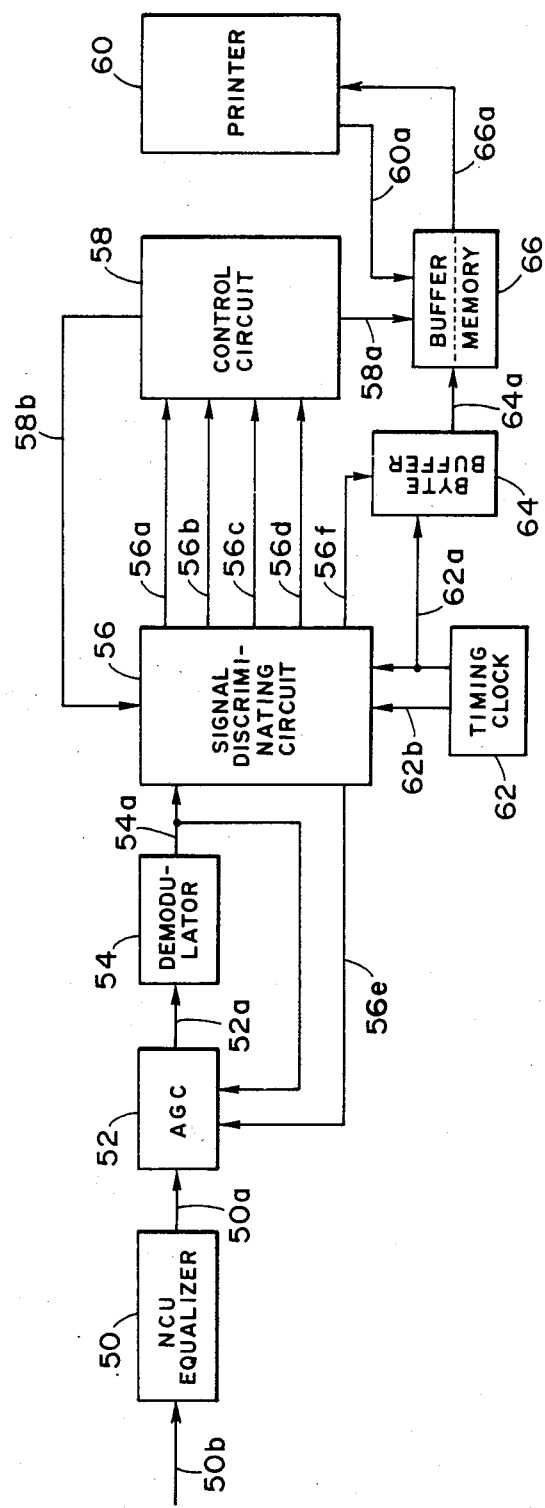
FIG. 8 is a block diagram showing the overall construction of the receiver used according to the present invention.

FIG. 8 is a block diagram of the receiver wherein a block 50 includes an NCU and an equalizer. The equalizer corrects the attenuation distortion, the group delay distortion, and so on of a telephone circuit. The output of the block 50 including the NCU and the equalizer is supplied to a signal line 50a. A telephone circuit 50b is connected to the input end of the block 50.

An automatic gain control circuit (to be referred to as an AGC circuit for brevity hereinafter) is connected to the output end of the block 50. A facsimile signal output from the transmitter is attenuated by the telephone circuit as a transmission medium before reception by the receiver. Although the amount of attenuation differs every time the circuit is set, it is constant from the connection of the circuit to the disconnection of the circuit after the completion of transmission. Therefore, facsimile signals received by the AGC circuit 52 must be amplified to a constant level for facsimile transmission every time the circuit is completed, that is, every time transmission is to be performed. The facsimile signals amplified to the constant level are output by the AGC circuit 52 to a signal line 52a. The output of a demodulator 54 is input to the AGC circuit 52 through a signal line 54a as a reference signal for the AGC operation. A signal for determining the timing of the AGC operation is also input to the AGC circuit 52 through a signal line 56e of a signal discriminating circuit 56. The AGC circuit 52 used in this embodiment performs the so-called keyed-AGC operation. According to this operation, the gain is controlled so that the output peak value of the demodulator 54 input from the signal 54a becomes 5 V only while the input from the signal line 56e is at level "1". The gain obtained up to this point is maintained if the input from the signal line 56e is at level "0".

An AM-PM-VSB demodulator 54 is of known construction. The demodulator 54 extracts carriers from the facsimile signals input from the signal line 52a of the AGC circuit 52, performs synchronous detection, and performs full-wave rectification. The received base band signal thus obtained is output to the signal line 54a.

The signal discriminating circuit 56 is the most important part of the present invention, the detailed block diagram of which will be referred to later. Based on the received base band signal input through the signal line 54a of the demodulator 54, the signal discriminating circuit 56 discriminates the synchronizing signal, the skip signal, the picture signal, and the guard band signal and outputs the obtained results to signal lines 56a, 56b, 56c, and 56d. The signal discriminating circuit 56 also prepares a binary picture signal from the received base band signal from the signal line 54a and outputs the binary picture signal to a signal line 56f. The signal discriminating circuit 56 also detects if the synchronizing signal is received and outputs to the signal line 56e a signal of level "1" only while the synchronizing signal is received. Therefore, the AGC circuit 52 performs the AGC operation only while the synchronizing signal is available.

Upon detecting various signals, a control circuit 58 controls a double buffer memory 66 to be described later through a signal line 58a so that the picture signal may be stored in the double buffer memory 66.

In response to a reading signal 60a, a printer 60 reads out through a data line 66a the picture signals stored in the double buffer memory 66.

A timing clock 62 operates the signal discriminating circuit 56 and a byte buffer 64 to be described later. The timing clock 62 has two signal lines 62a and 62b through which are output clock pulses at the same frequency as the bit timing clock pulses of the transmitter, that is, clock pulses of 7,720 Hz frequency in this embodiment, and clock pulses of higher frequency than the bit timing clock pulses, that is, clock pulses of 62.5 kHz frequency in this embodiment, respectively.

The byte buffer 64 comprises a serial-in parallel-out shift register. The byte buffer 64 receives the binary picture signal through the signal line 56f of the signal discriminating circuit 56 in synchronism with the bit timing clock pulse of the signal line 62a, and outputs 8-bit parallel image data to a signal line 64a.

The double buffer memory 66 comprises two 8×32-byte buffers and is capable of storing image data for two lines.

Figure 9:
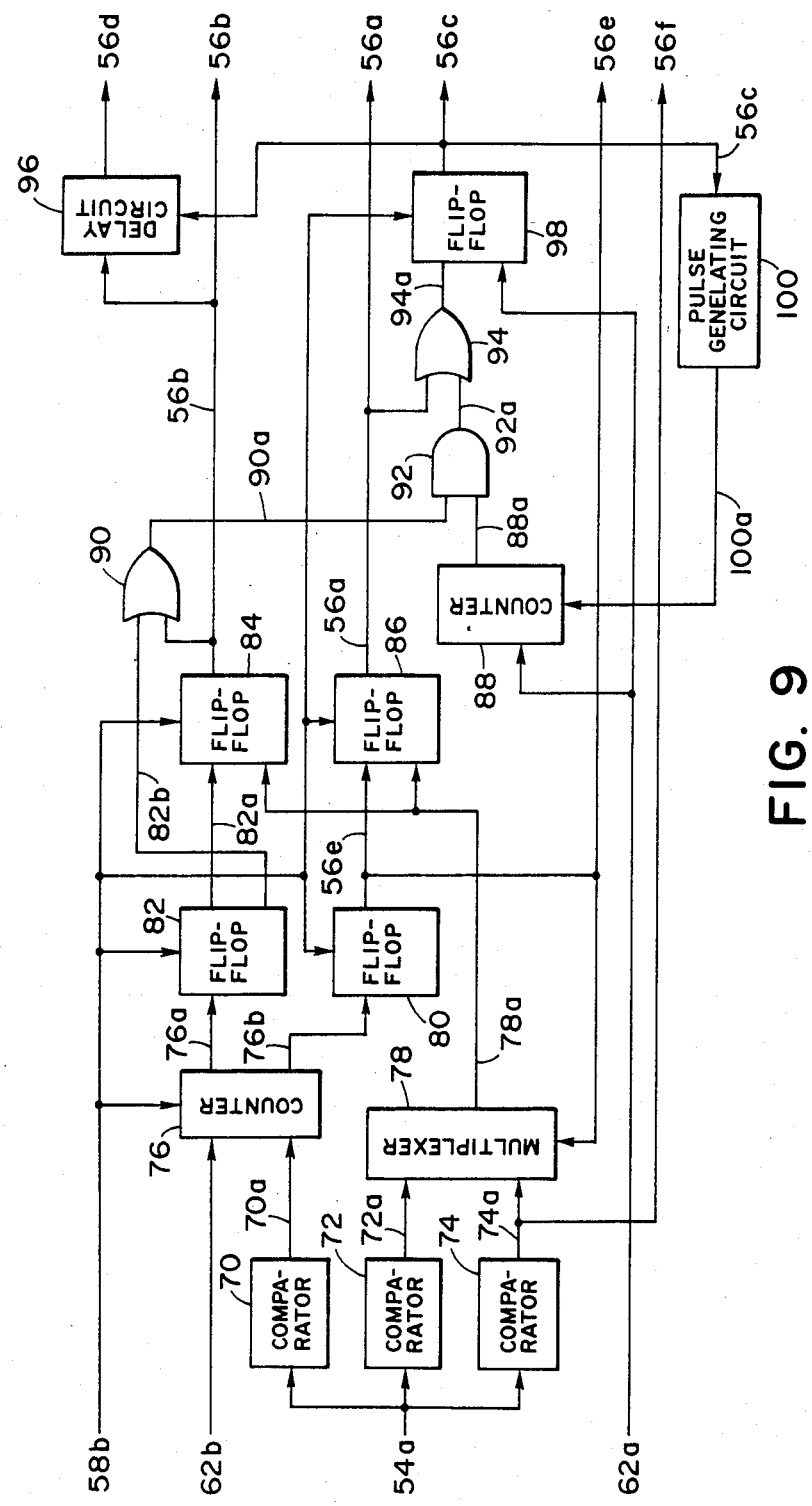
FIG. 9 is a detailed block diagram showing a signal discriminating circuit shown in FIG. 8.

FIG. 9 is a block diagram of the signal discriminating circuit 56. Comparators 70, 72, and 74 store reference voltages VH, VZ, and VP. The comparators 70, 72 and 74 compare the received base band signals input through the signal line 54a with the reference signals VH, VZ, and VP, respectively, and output the binary signals to signal lines 70a, 72a, and 74a. These reference voltages hold the relation VH>VZ>VP. The comparator 70 detects if the input signal is of high level or not, as in FIG. 2. When a signal of level "1" is obtained at the signal line 70a, it indicates that a signal of high level is received. When a signal of level "0" is obtained at the signal line 70a, it indicates that an input signal is not of high level. The comparator 72 detects if the input signal is of black signal level or not, as in FIG. 2(b). If a signal of level "0" is obtained at the signal line 72a, it indicates that the black point at the trailing edge of the skip signal is detected. The comparator 74 detects the black or white level signal, and outputs a binary picture signal of level "1" as a white signal and level "0" as a black signal.

A counter 76 counts the number of timing clock pulses input through the signal line 62b which are input only while the input level through the signal line 70a of the comparator 70 is at level "1". Thus, the counter 76 counts the duration of the high level pulse. In this embodiment, when the signal of high level has a duration exceeding 384 μs, a signal of a signal line 76a changes from level "0" to level "1". When the signal of high level has a duration exceeding 2,084 μs, a signal of a signal line 76b changes from level "0" to level "1". Since the period of the clock pulses input through the signal line 62b is 16 μs, a duration of 384 μs corresponds to 24 timing clock pulses through the signal line 62b. A duration of 2,048 μs corresponds to 128 timing clock pulses through the signal line 62b. As was described with reference to the transmitter of the system of the present invention, the skip signal of high level has a duration of 777 μs, and the synchronizing signal of high level has a duration of 5,958 μs. Therefore, an output of high level at the signal line 76a indicates that the synchronizing signal or the skip signal is received. If the signal at the signal line 76b is at level "1", it indicates that the synchronizing signal is received.

A multiplexer 78 selects either of the signals obtained through the signal lines 72a and 74a of the comparators 72 and 74, and outputs the inverted signal of the selected signal to a signal line 78a. Which one of the signals obtained through the signal lines 72a and 74a is to be selected is determined based on the value of the signal of the signal line 56e of a flip-flop 80 to be described later.

The flip-flop 80 operates so as to be set when the input level from the signal line 76b changes from level "0" to level "1", that is, so as to output a signal of level "1" to the signal line 56e.

A flip-flop 82 operates so as to be set when the input level from the signal line 76a changes from level "0" to level "1", that is, so as to output a signal of level "1" to a signal line 82a and a signal of level "0" to a signal line 82b. Therefore, when the signal of the signal line 56e of the flip-flop 80 is at level "1", it indicates that the synchronizing signal is received. When the signal at the signal line 82a of the flip-flop 82 is at level "1", it indicates that the skip signal or the synchronizing signal is received. The signal of the signal line 82b is in opposite relationship with the signal of the signal line 82a; the signal of the signal line 82a is at level "0" when the signal of the signal line 82b is at level "1", and vice versa.

A D flip-flop 84 is set or reset according to the level of the input signal from the signal line 82a when the input level from the signal line 78a changes from level "0" to level "1". When the input from the signal line 82a is at level "1", the D flip-flop 84 outputs a signal of level "1" to the signal line 56b. When the input from the signal line 82a is at level "0", the D flip-flop 84 outputs a signal of level "0" to the signal line 56b.

A D flip-flop 86 is set or reset according to the input level from the signal line 56e when the input level from the signal line 78a changes from level "0" to level "1", and outputs the result to the signal line 56a. The signal of the signal line 56a goes to level "1" when the flip-flop 86 is set and goes to level "0" when the flip-flop 86 is reset.

A byte counter 88 counts the bit timing clock pulses input through the signal line 62a. The output of the byte counter 88 is cleared to become 0 by a reset pulse input through a signal line 100a. Every time the byte counter 88 counts 8 bit timing clock pulses, the byte counter 88 outputs a signal of level "1" to a signal line 88a. Therefore, byte timing clock pulses of the same frequency as the byte timing clock pulses of the transmitter are supplied to the signal line 88a.

A signal line 90a of an OR gate 90 is connected to one input end of an AND gate 92, a signal line 92a of which is connected to one input end of an OR gate 94.

A delay circuit 96 may comprise a plurality of flip-flops or the like. The delay circuit 96 delays the data input through the signal line 56b by a time interval corresponding to two clock pulses input through the signal line 56c and outputs a delayed signal to the signal line 56d.

A D flip-flop 98 which may comprise other equivalent elements latches the data input through a signal line 94a of the OR gate 94 when the bit timing clock pulse input through the signal line 62a changes from level "0" to level "1", and outputs the latched data to the signal line 56c.

A pulse generating circuit 100 may comprise a monostable multivibrator or the like and outputs a pulse of a duration of several microns to the signal line 100a when the signal of the signal line 56c of the flip-flop 98 changes from level "0" to level "1". This pulse serves to reset the byte counter 88.

The output of the control circuit 58 shown in FIG. 8 is output to a signal line 58b. When data for discriminating the synchronizing signal, the skip signal, the guard band signal, and the picture signal are received through signal lines 56a, 56b, 56c and 56d from the signal discriminating circuit 56, the control circuit 58 outputs a clear pulse to the signal line 58b. In response to this clear pulse, all the counter 76 and all of the flip-flops 80, 82, 84, 86, and 98 are simultaneously cleared.

The configuration of the signal discriminating circuit 56 has been described with reference to FIG. 9. This may be summarized as follows. The signal discriminating circuit 56 checks the received base band signal input through the signal line 54a and checks the duration of the signal of high level and the presence or absence of black data. The signal discriminating circuit 56 thus differentiates the synchronizing signal, the skip signal, the guard band signal, and the picture signal, and outputs the obtained result to the signal lines 56a, 56b, 56c and 56d.

When one discriminating operation is completed, the signal of the signal line 56c changes from level "0" to "1". At this instant, the values of the signals of the signal lines 56a, 56b and 56d are determined. The four kinds of signals may be discriminated according to the algorithm shown in Table 1 below:

TABLE 1

| 56c | 56a | 56b | 56d | Signal Name |
| --- | --- | --- | --- | --- |
| 1 | 1 | 1 | x | Synchronizing signal |
| 1 | 0 | 1 | x | Skip signal |
| 1 | 0 | 0 | 1 | Guard band signal |
| 1 | 0 | 0 | 0 | Picture signal |

Note:
"x" in Table 1 above indicates that it may be either level "1" or "0".

The mode of operation of the receiver of the construction as described above will now be described with reference to the timing chart of FIG. 10.

FIG. 10(a) shows the configuration of the received signal. FIG. 10(b) shows the transmitted base band signal at the transmission side, which corresponds to FIG. 7(a) and also to the received base band signal.

When the synchronizing signal begins to be received, the signal of the signal line 70a of the comparator 70 goes to level "1" as shown in FIG. 10(d), and it is discriminated that a signal of high level is received. When the signal of high level continues to be received, the high level counter 76 counts the duration. When the high level counter 76 counts 24 clock pulses, that is, after about 384 μs has elapsed, the flip-flop 82 is set as shown at t1 in FIG. 10(h) and the signal of the signal line 82a goes to level "1". When the high level counter 76 counts 128 clock pulses, that is, after about 2,048 μs has elapsed, the flip-flop 80 is set as shown at t2 in FIG. 10(g), and the signal of the signal line 56e goes to level "1". This state is maintained until black data is received. During this period, since the signal of the signal line 56e is at level "1", the AGC circuit 52 operates to control the level of the base band signal so that the maximum level of the received base band signal may become 5 V (FIG. 10(c)). Since the signal of the signal line 90a of the OR gate 90 shown in FIG. 9 is at level "0", the signal of the signal line 92a of the AND gate 92 is at level "0", and the output of the flip-flop 86 is also at level "0". Therefore, the flip-flop 98 is kept reset, and the signal of the signal line 56c of the flip-flop 98 is kept at level "0". Since the signal of the signal line 56e is at level "1", the inverted signal of the output of the comparator 72 is selected as the output of the multiplexer 78.

When the output of the signal line 72a from the comparator 72 goes to level "0" as shown at t3 in FIG. 10(e), black data is detected. Therefore, at this time, the output of the signal line 78a changes from level "0" to level "1" to set the flip-flops 84 and 86. As a result of this, the output of the signal line 56a of the flip-flop 86 goes to level "1", and the output of a signal line 94a of the OR gate 94 goes to level "1". When the next bit timing clock pulse is output to the signal line 62a, as shown at t4 in FIG. 10(l), the flip-flop 98 is set, signaling to the control circuit 58 that the synchronizing signal is detected. At this instant, the signal of the signal line 56a is at level "1" and the signal of the signal line 56b is at level "1". Although not shown in the figure, the output of the guard flag 96 to the signal line 56d is at level "0", so that the synchronizing signal is detected.

The synchronizing signal consists of 56 bits, and the synchronizing signal is detected when its 48th bit is received. When the synchronizing signal is detected, the clear pulse from the control circuit 58 is input through the signal line 58b to reset the flip-flops 80, 82, 84, 86 and 98 and the counter 76 in the signal discriminating circuit. The signals of the signal lines 56a, 56b, 56c and 56e go to level "0". The AGC circuit stops operating and holds the amplification factor which is determined immediately before the synchronizing signal is detected, while the data of the line is received.

Figure 10:
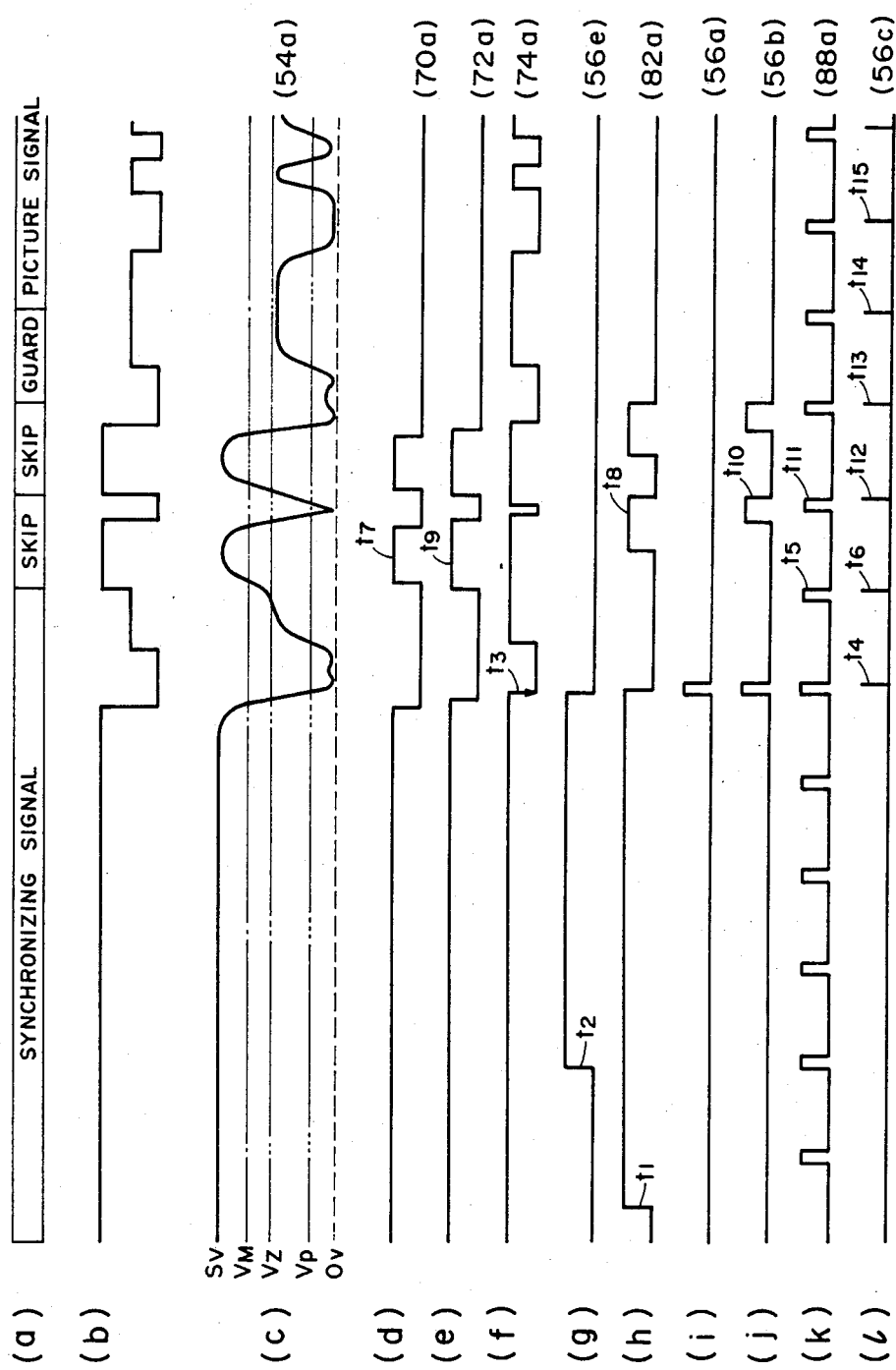
FIGS. 10(a) to 10(l) are timing charts for explaining the mode of operation of the signal discriminating circuit.

When the 8-bit picture signal is received next, the output of the signal line 88a of the byte counter 88 goes to level "1" as shown at t5 in FIG. 10k. Since the output of the signal line 90a from the OR gate 90 is at level "1", the output of the signal line 56c from the flip-flop 98 goes to level "1" as shown at t6 in FIG. 10(*l*). The signals of the signal lines 56a and 56b are both at level "0", and the signal of the signal line 56b at the timing shown at t4 in FIG. 10(*l*) is output to the signal line 56d. Thus, the signal of the signal line 56d is at level "1", and it is thus detected that the guard band signal is received. Thus, in the embodiment of FIG. 9, the guard band signal is detected only after one or more skip signals have been detected. Then, at this instant, the control circuit 58 controls so that the double buffer memory 66 does not store any content. This guard band signal is included so as to eliminate the adverse effects to the subsequent picture signal of ringing at the trailing edge of the synchronizing signal. This ringing is of great magnitude since both the synchronizing signal and the skip signal are at high level. Therefore, the significance of including the guard band signal is great.

The subsequent signal is then received. As shown at t7 in FIG. 10(*d*), a signal of high level is detected. When this signal of high level continues for a duration of 384 μs, the flip-flop 82 is set as shown at t8 in FIG. 10(*h*). When black data is detected as shown at t9 in FIG. 10(*e*), the flip-flop 84 is set, and the output of the signal line 56b goes to level "1" as shown at t10 in FIG. 10(*j*). Therefore, the output of the OR gate 90 goes to level "1". When the next byte timing pulse goes to level "1" at t11 in FIG. 10(*k*), the input of the signal line 94a to the flip-flop 98 goes to level "1" through the AND gate 92 and the OR gate 94. The flip-flop 98 is set at the next byte timing clock pulse of the signal line 62a, and the signal of the signal line 56c goes to level "1" as shown at t12 in FIG. 10(*l*). Since the signal of the signal line 56a is at level "0", the signal of the signal line 56b is at level "1", and the signal of the signal line 56d is at level "0", it is discriminated that the skip signal is received. In this case, the control circuit 58 controls so that the white signal data for one block, that is, 64 bits of white signal data is written in the double buffer memory 66. In a similar manner, the skip signal corresponding to the second block and the guard band signal are detected at the timings shown at t13 and t14 in FIG. 10(*l*). Thereafter, the picture signal corresponding to the third block is received.

The present invention has thus been described with reference to its preferred embodiments with particular attention to the transmission side and the receiving side. Although the preferred embodiments described largely involve hardware, a large portion of the elements may be replaced by adopting microcomputers or the like using software and the configuration may be varied with ease as needed. Applications for reducing the memory capacity may be practiced by adopting the principle of the present invention for, for example, accumulating image data.

As thus has been described above, the system according to the present invention has the distinct features and advantages as described below:

(1) The white block skip system may be easily combined with the analog transmission system with which the error rate is great by adopting the skip signal and the synchronizing signal, each consisting of a plurality of bits, which are the important data in the white block skip system.

(2) The synchronizing signal and the skip signal are well differentiated from the picture signal in terms of amplitude data and duration data. Since phase data is not used for differentiation as in the conventional system, the algorithm for detection becomes simple and the cost of the equipment is reduced to the minimum. The system of the present invention may be applied not only to the AM-PM-VSB system but also to the AM-DSB system.

(3) The synchronizing signal and the skip signal each consist of, both at the transmission side and the receiving side, bits obtained by multiplying a known number n by an integer. These signals are so configured that a pulse of high level is first generated for certain bits and then a pulse of black level is generated. Therefore, at the receiving side, a signal check may be performed for every n bits (every byte timing clock pulse in the embodiment described above), so that errors in the received images due to transmission line distortion are minimized. Furthermore, the pulses of black signal level are always generated before the byte timing clock pulses. In addition, the receiving side incorporates a plurality of comparators so that the pulse of black signal level of the skip signal is generated before the pulse of black signal level of the general picture signal. Accordingly, stable operation may be achieved due to the use of round pulses.

(4) The detection of the synchronizing signal and the AGC operation may be performed simultaneously according to the method of the present invention. Therefore, transmission of higher speed than the conventional system wherein the AGC operation is performed after the detection of the synchronizing signal may be achieved.

(5) In the method which utilizes phase data for discriminating the control signal and the picture signal, ringing at the trailing edge of the control signal may adversely affect the leading edge of the subsequent picture signal since a control signal of high level (great amplitude) is used. However, according to the system of the present invention, a guard band signal is included only if the picture signal immediately follows a skip signal, and a guard band signal is not included when skip signals are generated in succession. Therefore, high speed transmission with small degradation in image quality may be achieved.

What I claim is:

1. An image processing apparatus comprising:
    means for dividing a picture signal sequence of a scanning line into blocks, each consisting of N picture signals, where N is a predetermined number;

means for processing the blocks of N picture signals to be transmitted according to white and black data comprising the picture signals of the blocks formed by said dividing means, wherein an l-bit synchronizing signal is generated to precede transmission of the picture signals of each scanning line, an n-bit skip signal is generated to replace the picture signals for each block containing only white data, where $1<n<N$, and an m-bit guard band signal, where m is a predetermined number, is generated to precede transmission of the picture signals for each said block containing black data, and wherein said skip signal and the picture signals for a block containing black data are generated in the same sequence as the corresponding picture signals in said scanning line and said guard band signal is generated for transmission only at a time that is immediately before a picture signal block containing black data and immediately after said skip signal; and means for modulating and transmitting the processed signals without phase information.

2. An apparatus according to claim 1, further comprising pattern generating means for selectively generating one among the synchronizing signal, the skip signal, and the guard band signal; and means for selectively outputting either the signal generated by said pattern generating means or the picture signal.

3. An apparatus according to claim 1 or 2, wherein bit length n of the skip signal is smaller than bit length l of the synchronizing signal.

4. An apparatus according to claim 1 or 2, wherein bit length l of the synchronizing signal, bit length m of the guard band signal, and bit length n of the skip signal are set to be multiples of an integer a.

5. An image processing apparatus comprising:

means for dividing a picture signal sequence of a scanning line into blocks, each consisting of N picture signals, where N is a predetermined number;

means for processing the blocks of N picture signals to be transmitted according to white and black data of the picture signals of the blocks formed by said dividing means, wherein a synchronizing signal of a first amplitude greater than a maximum amplitude of the picture signals is generated to precede transmission of the image data of each scanning line, a skip signal of the first amplitude is generated to replace the picture signals for each block containing only white data, and a guard band signal is generated to precede transmission of the picture signals for each of the blocks containing black data, and wherein the skip signal and the picture signals for a block containing black data are generated in the same sequence as the corresponding picture signals in the scanning line and the guard band signal is generated for transmission only at a time that is immediately before a picture signal block containing black data, and immediately after the skip signal; and means for modulating and transmitting the processed signals without phase information.

6. An apparatus according to claim 5, further comprising pattern generating means for generating signals for specifying the amplitudes of the synchronizing signal, the skip signal and the guard band signal; and means for varying an amplification factor of an input signal based on the signal generated by said pattern generating means.

7. An apparatus according to claim 5 or 6, wherein the synchronizing signal has a second amplitude of zero at a trailing edge thereof.

8. An apparatus according to claim 5 or 6, wherein the skip signal has a second amplitude of zero at a trailing edge thereof and has a duration different from the duration of the synchronizing signal.

9. An apparatus according to claim 5 or 6, wherein the guard band signal has a second amplitude of zero at a leading edge thereof.

10. An image processing apparatus comprising:

means for dividing a picture signal sequence of a scanning line into blocks, each consisting of N picture signals, where N is a predetermined number;

means for processing the blocks of N picture signals to be transmitted according to white and black data of the picture signals of the blocks formed by said dividing means, wherein an l-bit synchronizing signal, where l is a predetermined number, having a first amplitude which is greater than a maximum amplitude of the picture signals is generated to precede transmission of each scanning line, an n-bit skip signal of the first amplitude is generated to replace the picture signals for each block containing only white data, where $1<n<N$, and an m-bit guard band signal of the same amplitude as the amplitude of the picture signal, where m is a predetermined number, is generated to precede transmission of the picture signals for each said block containing black data, and wherein the skip signal and the picture signals for a block containing black data are generated in the same sequence as the corresponding picture signals in the scanning line and the guard band signal is generated for transmission only at a time that is immediately before a picture signal block containing black data, and immediately after the skip signal.

11. An apparatus according to claim 10, wherein bit length n of the skip signal is smaller than bit length l of the synchronizing signal.

12. An apparatus according to claim 10, wherein bit length l of the synchronizing signal, bit length m of the guard band signal, and bit length n of the skip signal are set to be multiples of an integer a.

* * * * *

UNITED STATES PATENT AND TRADEMARK OFFICE
CERTIFICATE OF CORRECTION

PATENT NO. : 4,543,611
DATED : September 24, 1985
INVENTOR(S) : SADASUKI KURAHAYASHI It is certified that error appears in the above-identified patent and that said Letters Patent is hereby corrected as shown below:

Sheet 7 of 8, change "PULSE GENELATING CIRCUIT" to --PULSE GENERATING CIRCUIT--.

Col. 1, line 8, change "INVENTION:" to --INVENTION--.

Col. 2, line 21, change "THE DRAWING" to --THE DRAWINGS--.

Col. 2, line 35-6, change "FIG. 3; FIGS./71a)" to --FIG. 3;/FIGS. 7(a)--.

Col. 8, line 16, change "checked-if" to --checked if--.

Col. 8, line 31, change "30band" to --30b and--.

Col. 9, line 22-3 change "FF) corresponding to the address/ O is loaded in the byte buffer 18 as shown in Fig. 7(d)" to --FF) corresponding to the address/O is loaded in the byte buffer 18 as shown in FIG. 7(d).--

Col. 9, line 56, change "operates the" to --operates, the--.

Col. 17, line 4, change "an" to --a--.

Col. 18, line 31, change ;an" to --a--.

Signed and Sealed this

Fourth Day of November, 1986

[SEAL]

Attest:

DONALD J. QUIGG

Attesting Officer

Commissioner of Patents and Trademarks